No. 639,683. Patented Dec. 19, 1899.
A. H. NEALE.
GAS ENGINE.
(Application filed Aug. 15, 1898.)
(No Model.) 4 Sheets—Sheet 1.
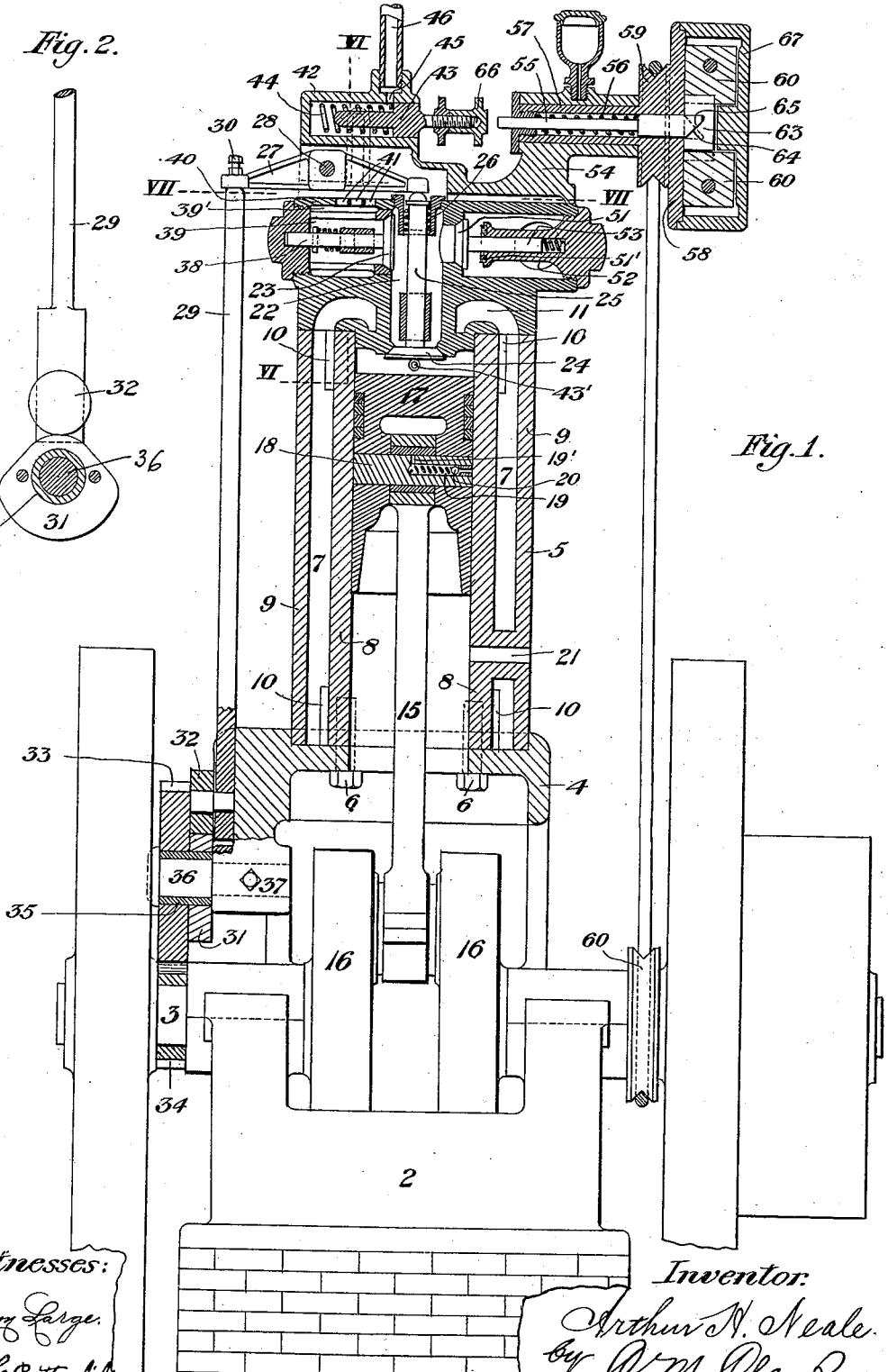
Witnesses:
Watson Large.
C. C. Butterfield.
Inventor:
Arthur H. Neale.
by O. M. Clarke
his Attorney.
THE NORRIS PETERS CO., PHOTO-LITHO., WASHINGTON, D. C.

No. 639,683. Patented Dec. 19, 1899.
A. H. NEALE.
GAS ENGINE.
(Application filed Aug. 15, 1898.)
(No Model.) 4 Sheets—Sheet 2.
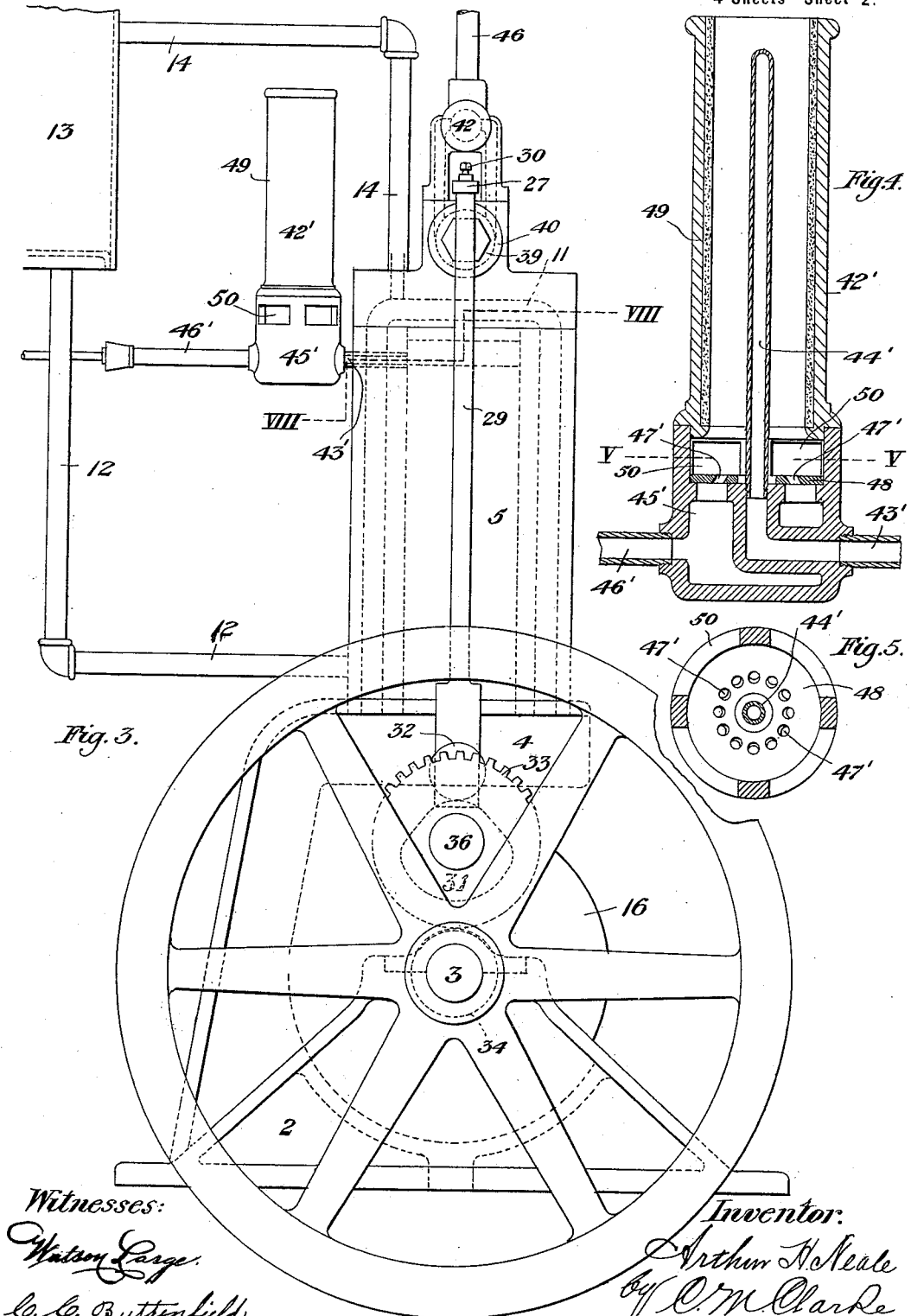
Witnesses:
Watson Large.
C. C. Butterfield.
Inventor:
Arthur H Neale
by O. M. Clarke
his Attorney.
THE NORRIS PETERS CO., PHOTO-LITHO., WASHINGTON, D. C.

No. 639,683. Patented Dec. 19, 1899.
A. H. NEALE.
GAS ENGINE.
(Application filed Aug. 15, 1898.)
(No Model.) 4 Sheets—Sheet 3.
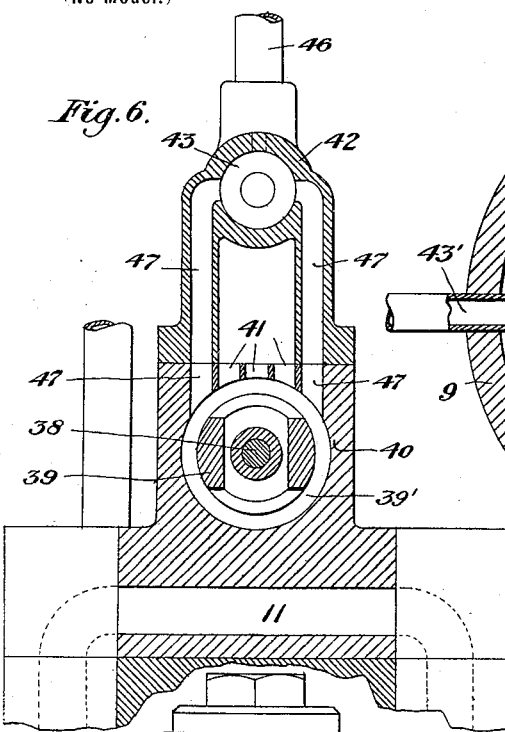
Fig. 6.
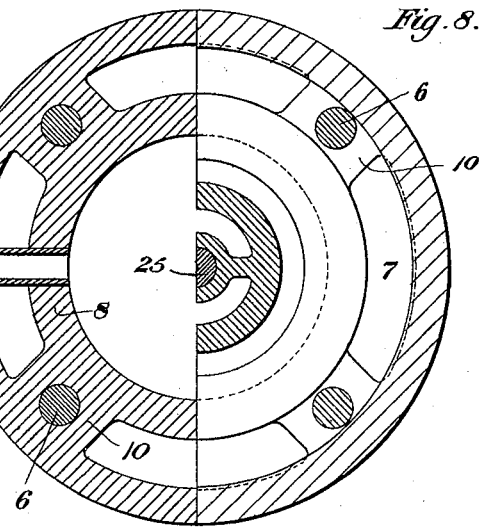
Fig. 8.
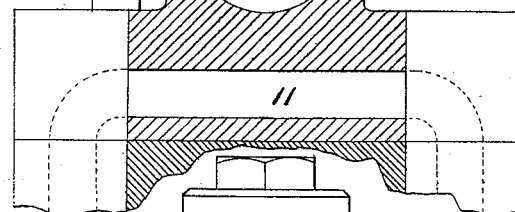
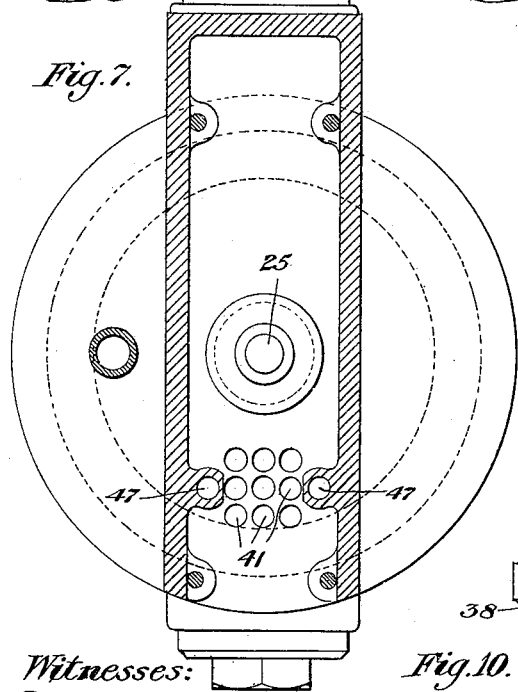
Fig. 7.
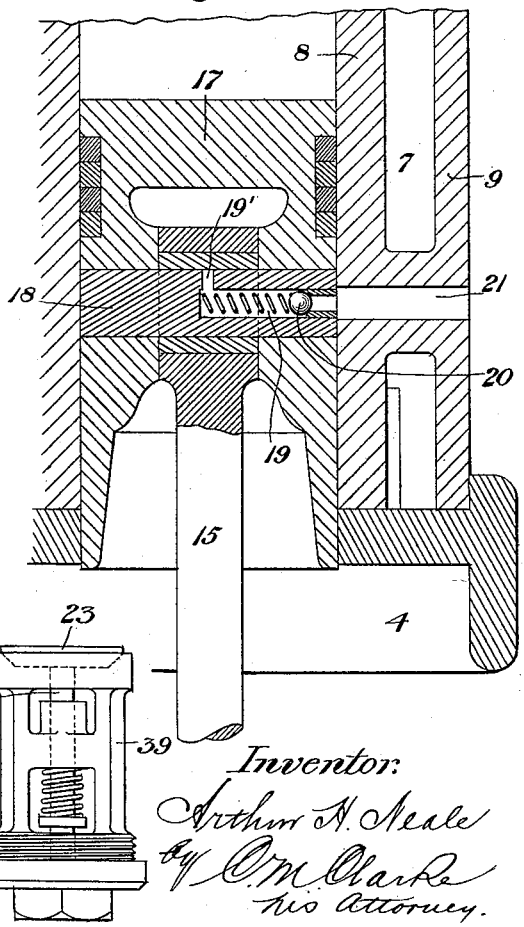
Fig. 9.
Fig. 10.
Witnesses:
Watson Large.
C.C. Butterfield.
Inventor:
Arthur H. Neale
by C.M. Clarke
his Attorney.
THE NORRIS PETERS CO., PHOTO-LITHO., WASHINGTON, D. C.

No. 639,683. Patented Dec. 19, 1899.
A. H. NEALE.
GAS ENGINE.
(Application filed Aug. 15, 1898.)
(No Model.) 4 Sheets—Sheet 4.
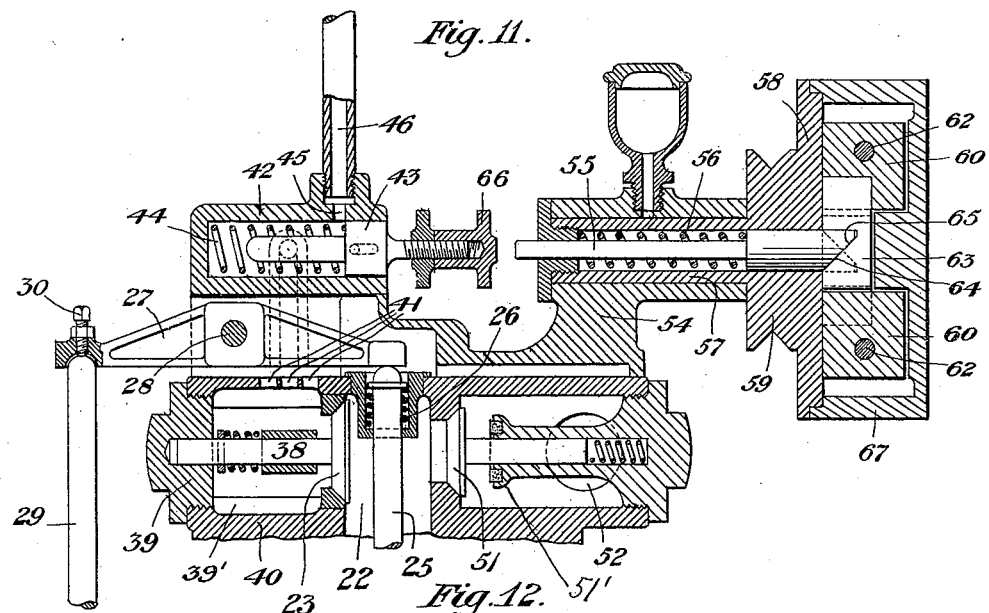
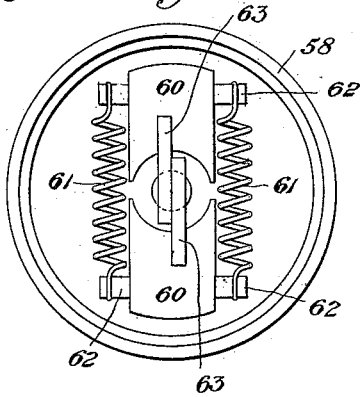
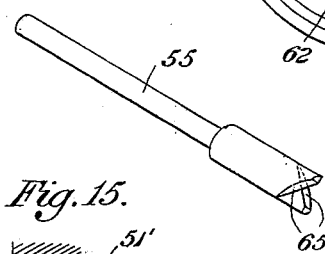
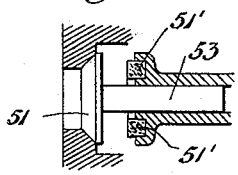
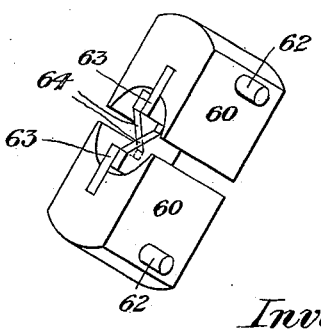
Witnesses:
Watson Large.
C. C. Butterfield
Inventor:
Arthur H. Neale
by C. M. Clarke
his Attorney
THE NORRIS PETERS CO., PHOTO-LITHO., WASHINGTON, D. C.

UNITED STATES PATENT OFFICE.

ARTHUR H. NEALE, OF BEAVER FALLS, PENNSYLVANIA, ASSIGNOR OF THIRTEEN TWENTY-FOURTHS TO TIMOTHY FRENCH, OF ALLEGHENY, AND CHARLES M. CLARKE, OF PITTSBURG, PENNSYLVANIA.

GAS-ENGINE.

SPECIFICATION forming part of Letters Patent No. 639,683, dated December 19, 1899.

Application filed August 15, 1898. Serial No. 688,561. (No model.)

*To all whom it may concern:*

Be it known that I, ARTHUR H. NEALE, a citizen of the United States, residing at Beaver Falls, in the county of Beaver and State of Pennsylvania, have invented or discovered a new and useful Improvement in Gas-Engines, of which the following is a full, clear, and exact description, reference being had to the accompanying drawings, forming part of this specification, in which—

Figure 1 is a central vertical section through my engine. Fig. 2 is a detail view of the valve-rod and operating-cam. Fig. 3 is a side elevation. Fig. 4 is a sectional detail view of the igniter. Fig. 5 is a cross-section taken on the line V V of Fig. 4. Fig. 6 is an enlarged sectional view indicated by the line VI VI of Fig. 1. Fig. 7 is a horizontal section indicated by the line VII VII of Fig. 1. Fig. 8 is a cross-section indicated by the line VIII VIII of Fig. 3. Fig. 9 is a detail view of a portion of the cylinder and the piston in the lowest position. Fig. 10 is a plan view of the gas and air inlet valve and casing. Fig. 11 is a sectional view, enlarged, of the upper portion of the engine, illustrating the governor. Fig. 12 is a face view of the governor with the outer casing removed. Fig. 13 is a perspective detail view of the governor-weights. Fig. 14 is a similar view of the stem. Fig. 15 is a detail view of the exhaust-valve, illustrating a modified construction employing a buffer for the valve. Fig. 16 is a detail view of the gear-supporting stud.

I shall now describe my invention so that others skilled in the art may manufacture and use the same.

Referring now to the drawings, 2 is the base of the engine, provided with suitable bearings for the main shaft 3, carrying the usual fly-wheel and pulley, while the base is extended upwardly to form a support 4 for the cylinder 5, secured to it by bolts 6. The cylinder is provided with a water-compartment space 7, intervening between the inner and outer walls 8 9, the space extending from top to bottom of the cylinder and completely around it, while at top and bottom are intervening bridges 10, which serve to maintain the inner and outer cylinders in rigid relation to each other and to provide metal for insertion of the bolts. In the top of the cylinder is formed a circular chamber 11, registering with space 7 and contracted around the inlet-valve.

A circulation of water is maintained through the water-chamber by pipe 12, leading from the base of a water-tank 13, while outlet-pipe 14, leading to a higher level, discharges the heated water into the tank, the circulation being induced by the rise of the water as it becomes heated by contact with the cylinder. A pitman 15 connects the cranks 16 with the piston 17, which is mounted within the interior of the cylinder constituting the explosion-chamber.

For the purpose of oiling the pitman-bearings in the piston the pin 18 is made hollow by port 19 through its center at one side, with a branch port 19' leading up into the bearings. Inside the port 19 is a spring-controlled valve 20, and when the piston is at the bottom of the stroke the port 19 comes into register with port 21 through the cylinder, into which the nozzle of an oil-can may be inserted, displacing the valve and oiling the joint.

Located centrally above the cylinder is a chamber 22, into which opens the gas and air inlet valve 23 and from which the mixed gas and air pass into the explosion-chamber downwardly through valve 24. This valve is mounted on stem 25 and is normally held closed by spring 26. A lever 27, pivoted at 28, bears on the upper end of stem 25, while the opposite end bears on the upper end of an actuating-rod 29, the lever being provided with a set-screw 30, bearing on the upper end of rod 29, by which all wear is taken up. The rod 29 is raised at each alternate revolution by means of cam 31 riding under roller 32 on the lower end of the rod, the cam revolving with a toothed wheel 33 in mesh with and of double the diameter of a driving pinion-wheel 34 on the main shaft. The gear 33 and cam 31 are mounted on a bushing 35, of brass or other non-frictional metal, surrounding a stud 36, eccentrically enlarged for taking up wear, held by a set-screw in a depending lug 37 of the main frame. The inlet-valve 23 is mounted on the end of a stem 38, having a bearing in a hollow shell 39, inserted into a mixing-chamber 39', screwed into the head of the cylinder 40 and reduced in diameter, so as to leave a surrounding communicating passage for the gas, while the opposite sides are open to further facilitate their passage. Into this valve-chamber open the several air-ports 41, leading downwardly from the upper face of the head, their location being concealed and protected by the gas-valve chamber 42, immediately above. In this chamber is a reciprocating valve-piston 43, adapted to be held open normally by pressure of spring 44, admitting gas through port 45 from pipe 46, leading from any source of supply. At each side of the valve are ports 47, by which the gas is conveyed downwardly into the valve-chamber 39', wherein it is commingled with the air admitted through ports 41 and from where it escapes into chamber 22 through valve 23 and into the explosion-chamber upon the downward stroke of the piston and opening of the valve 24. The ignition of the mixture of gas and air is accomplished by means of the heater 42', into the center of which leads a pipe 43', communicating with the explosion-chamber and terminating in a vertical pipe 44', having a closed end. These pipes lead through the hollow base 45' of the heater, into which fuel-gas and air are admitted by pipe 46, escaping upwardly through openings 47' in a plate 48, the openings being inclined inwardly and circularly disposed around the central pipe 44'. Upon the base is set a coping 49, lined with asbestos, and the base is provided with air-inlet openings 50, and when combustion of the fuel-gas takes place within the coping the pipe 44' is heated to a high temperature. When by upward travel of the piston the gas is compressed and forced into the pipe 44', it becomes sufficiently heated to ignite and produce an explosion, forcing the piston down, and in its upward travel the products of combustion will be forced out through the opened valve 24 into chamber 22 and thence through valve 51 finally to exhaust-port 52.

The valve 51 is mounted on a spring-controlled stem 53 and is adapted to remain closed until forced open by pressure of the internal products of combustion. I have provided a buffer 51', of any suitable resilient material, to absorb the shock of the valve.

Mounted in an upper extension 54 of the head is the spindle 55 of the governor, adapted to be retracted by spring 56 while surrounding the stem, and also journaled in the extension 54 is a sleeve 57 of the governor-case 58. This case is provided with a grooved wheel 59, adapted to be driven by cable from a similar grooved wheel 60 on the main shaft, whereby the speed of the governor is regulated by the speed of the engine. Within the governor-case are mounted the weights 60, held together by springs 61 attached to pins 62 at each side, the weights being provided with plates 63, lapping each other at the center. These plates are provided with oppositely-disposed wedge-faces 64, adapted to bear upon correspondingly-shaped faces 65, made in the enlarged end of the stem 55. When by reason of excessive speed the weights are thrown out by centrifugal force, the wedge-faces will force the stem forwardly and its end will come in contact with an adjusting-spool 66, adapted to be set on the threaded end of the stem of the valve 43, thus forcing the valve in and partially or wholly cutting off the supply of gas, thereby reducing the speed of the engine.

An inclosing case 67 surrounds the weights and other parts of the governor and makes it very compact and ornamental in appearance.

The construction of my engine is very simple, compact, and cheap, and it may be operated continuously without getting out of order, while the advantages over other forms of gas-engines will be appreciated by users of this class of engines.

Changes and modifications may be made in its design or proportions without departing from my invention, as I do not desire to be limited to the exact construction shown in the drawings, but to include all such modifications as would be suggested to the skilled mechanic.

Having described my invention, what I claim, and desire to secure by Letters Patent, is—

1. A gas-engine comprising a cylinder having an explosion-chamber at one end thereof, a reservoir-chamber, a valve between the explosion-chamber and the reservoir-chamber and means for operating said valve, a gas and air mixing chamber, and a spring-controlled valve between the mixing-chamber and the reservoir-chamber adapted to open under pressure to establish communication between the two chambers.

2. A gas-engine provided with a cylinder having an explosion-chamber at one end thereof, a reservoir-chamber, an intervening valve and means for operating the same, a mixing-chamber, a spring-controlled valve between the mixing-chamber and the reservoir-chamber adapted to open under pressure to establish communication between the two chambers, an exhaust-valve opening outwardly from the reservoir-chamber, and an igniting device in communication with the explosion-chamber.

3. A gas-engine comprising a cylinder having an explosion-chamber at one end thereof, an igniting device in communication with the explosion-chamber, a reservoir-chamber provided with a valve opening into the explosion-chamber, a mixing-chamber, a spring-controlled valve between the mixing-chamber and the reservoir-chamber adapted to open under pressure to establish communication between the two chambers, air and gas ports opening into the mixing-chamber, and an exhaust-valve leading from the reservoir-chamber.

4. A gas-engine comprising a cylinder, a piston mounted therein with a connecting-rod attached to the engine-crank, an explosion-chamber at one end of the cylinder, an igniting device communicating with the explosion-chamber, a reservoir-chamber, a valve between the explosion-chamber and the reservoir-chamber said valve having a stem projecting upwardly through the reservoir-chamber a pivoted lever adapted to depress the valve to establish communication between the reservoir-chamber and the explosion-chamber, an actuating-rod for operating said lever, means for imparting motion to the rod, a mixing-chamber, a valve between the mixing-chamber and the reservoir-chamber adapted to open under pressure to establish communication between the two chambers, and an exhaust-valve opening outwardly from the reservoir-chamber.

5. A gas-engine comprising a cylinder having an explosion-chamber at one end thereof, an igniting device in communication with the explosion-chamber, a piston mounted in the cylinder, a reservoir-chamber, a valve between the explosion-chamber and the reservoir-chamber having a stem projecting upwardly through the reservoir-chamber with means for opening said valve and establishing communication with the explosion-chamber, a gas and air mixing chamber adjacent to the reservoir-chamber, a spring-controlled valve between the mixing-chamber and the reservoir-chamber adapted to open under pressure to establish communication between the two chambers, air-ports opening into the mixing-chamber from the atmosphere, gas-ports leading therein, a gas-inlet-controlling valve, and an exhaust-valve opening outwardly from the reservoir-chamber.

6. A gas-engine comprising a cylinder having an explosion-chamber at one end thereof, an igniting device in communication with the explosion-chamber, a piston mounted in the cylinder, a reservoir-chamber, a valve between the explosion-chamber and the reservoir-chamber having a stem projecting through the reservoir-chamber with means for depressing the stem and opening the valve to establish communication between the explosion-chamber and the reservoir-chamber, a gas and air mixing chamber adjacent to the reservoir-chamber, a spring-controlled valve between the mixing-chamber and the reservoir-chamber adapted to open under pressure to establish communication between the two chambers, air-ports opening into the mixing-chamber from the atmosphere, gas-ports leading into the mixing-chamber, a gas-inlet-controlling valve, a speed-regulating governor adapted to operate said last-named valve to regulate the admission of gas to the mixing-chamber, and an exhaust-valve leading from the reservoir-chamber.

7. A gas-engine comprising a cylinder having an explosion-chamber at one end thereof, an igniting device in communication with the explosion-chamber, a piston mounted in the cylinder, a reservoir-chamber, a valve between the reservoir-chamber and the explosion-chamber having a stem projecting through the reservoir-chamber with means for depressing the stem and opening the valve to establish communication between the explosion-chamber and the reservoir-chamber, a gas and air mixing chamber adjacent to the reservoir-chamber, a spring-controlled valve between the mixing-chamber and the reservoir-chamber adapted to open under pressure to establish communication between the two chambers, air-ports leading into the mixing-chamber from the atmosphere, gas-ports leading into the mixing-chamber, a gas-inlet-controlling valve provided with an adjustable extension, a speed-regulating governor adapted to operate such valve to regulate the admission of gas, and an exhaust-valve leading from the reservoir-chamber.

8. A gas-engine having an explosion-chamber at one end of its cylinder, in combination with a mixing-chamber formed integrally with or secured to the end of said cylinder, said mixing-chamber having air-inlets in its upper surface, and a gas-chamber situate above the mixing-chamber and over said air-inlets and communicating with the mixing-chamber by vertical ports extending down outside the air-ports.

9. A gas-engine having an explosion-chamber at one end of its cylinder, in combination with a mixing-chamber formed integrally with or secured to the end of said cylinder, said mixing-chamber having air-inlets in its upper surface, a gas-chamber situate above the mixing-chamber and over said air-inlets and communicating with the mixing-chamber by vertical ports extending down outside the air-ports, and a valve situate in said gas-chamber for controlling the gas-inlet thereto said valve being adapted to be operated automatically by the governor mechanism of the engine.

10. A gas-engine having an explosion-chamber at one end of its cylinder, a mixing-chamber above the end of the cylinder, a gas-chamber situate above the mixing-chamber so as to provide a space between the top of the mixing-chamber and the bottom of the gas-chamber, a valve opening into the explosion-chamber and provided with a stem, a spring by which said valve is closed automatically, a pivoted lever lying in said space between the mixing-chamber and the gas-chamber and bearing on the stem of said valve, a rod for operating said lever to open the valve, and mechanism for periodically operating the rod.

In testimony whereof I have hereunto set my hand.

ARTHUR H. NEALE.

Witnesses:
THOS. M. BROWN,
C. M. CLARKE.